United States Patent

Sankey et al.

[11] 3,910,934
[45] Oct. 7, 1975

[54] PROCESS FOR THE PREPARATION OF α-(HYDROXY AND ALKOXY SUBSTITUTED)PHENYL-α-(2-PIPERIDINYL)-METHANOLS

[75] Inventors: George H. Sankey, Loughborough; Keith D. E. Whiting, Hatfield, both of England

[73] Assignee: Minnesota Mining and Manufacturing Company, St. Paul, Minn.

[22] Filed: Aug. 7, 1974

[21] Appl. No.: 495,335

Related U.S. Application Data

[62] Division of Ser. No. 39,571, May 21, 1970, abandoned.

[52] U.S. Cl. ........ 260/293.84; 260/293.83; 424/267
[51] Int. Cl.² .................................... C07D 211/22
[58] Field of Search ............... 260/293.83, 293.84

[56] References Cited
UNITED STATES PATENTS
3,705,169  12/1972  Kaiser et al. .................. 260/293.84

Primary Examiner—G. Thomas Todd
Attorney, Agent, or Firm—Alexander, Sell, Steldt & DeLaHunt

[57] ABSTRACT

α-(Hydroxy and alkoxy substituted)phenyl-α-(2-piperidinyl)methanols of the formula

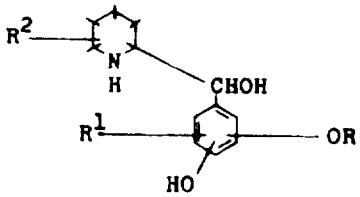

wherein R is hydrogen or lower alkyl; $R^1$ is hydrogen, hydroxy or lower alkoxy; and $R^2$ is hydrogen, lower alkyl, phenyl, phenyl-lower alkyl, diphenyl-lower alkyl, phenoxy-lower alkyl or diphenoxy-lower alkyl; and the non-toxic pharmaceutically acceptable acid-addition and quaternary ammonium salts thereof.

1 Claim, No Drawings

PROCESS FOR THE PREPARATION OF α-(HYDROXY AND ALKOXY SUBSTITUTED)PHENYL-α-(2-PIPERIDINYL)-METHANOLS

This is a division of application Ser. No. 39,571, filed May 21, 1970, now abandoned.

BACKGROUND OF THE INVENTION

The compounds of the invention are in the field of 2-piperidylphenyl-methanols.

Compounds of the general type are known, e.g., piperidylphenyl-methanol derivatives in which the phenyl group is substituted in the 4-position by a halogen, lower alkyl, lower alkoxy or methylenedioxy group, as shown in U.S. Pat. No. 2,928,835. The compound wherein the phenyl ring is 3,4-dimethoxy-substituted is described in British Pat. No. 843,070. The corresponding 2-piperidyl-m- or p-hydroxyphenyl methanols are found in Diss. Abstr. B, 28, No. 7, pps. 2783-4, Univ. Mich. 1966. The unsubstituted compound α-(2-piperidyl)-α-phenyl methanol is disclosed in British Pat. No. 994,964. While the compounds known to the art have had physiological activity, they have not had the useful bronchodilator activity displayed by the compounds of the invention.

This invention relates to substituted α-phenyl-α-(2-piperidinyl)methanols, to processes for the preparation thereof and to the use of said compounds and compositions containing them as bronchodilators.

The chemical compounds of the invention have the formula

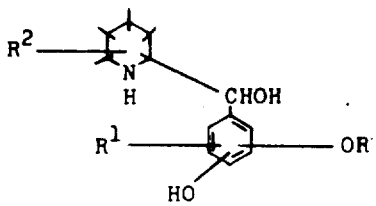

wherein R is hydrogen or lower alkyl; $R^1$ is hydrogen, hydroxy or lower alkoxy; and $R^2$ is hydrogen, lower alkyl, phenyl, phenyl-lower alkyl, diphenyl-lower alkyl, phenoxy-lower alkyl or diphenoxy-lower alkyl. Preferred compounds of the invention are those wherein the phenyl ring is substituted by at least two hydroxy groups in either the 3 and 5 positions or the 3 and 4 positions.

Process I of the invention comprises condensing a poly-lower alkoxy substituted benzaldehyde with picolinic acid or a lower alkyl-substituted picolinic acid to form an α-(poly-lower alkoxyphenyl)-α-(2-pyridinyl)methanol or α-(poly-lower alkoxyphenyl)-(lower alkyl-substituted)-α-(2-pyridinyl)methanol intermediate, oxidizing said intermediate to form a (poly-lower alkoxyphenyl) 2-pyridylketone or (poly-lower alkoxyphenyl) (lower alkyl-substituted-2-pyridyl)-ketone intermediate, dealkylating to form the corresponding (poly-hydroxyphenyl) (2-pyridyl)ketone or (polyhydroxy-phenyl) (lower alkyl-substituted-2-pyridyl)ketone intermediate which is hydrogenated to give the α-(polyhydroxyphenyl)-α-(2-piperidinyl)methanol or α-(polyhydroxyphenyl)-(lower alkyl-substituted)-α-(2-piperidinyl)methanol final product.

Process II of the invention comprises treating a lower alkoxy-substituted p-benzyloxybenzaldehyde (or di- or tri-alkoxy-substituted benzaldehyde) with a 2-pyridyl- or lower alkyl-substituted-2-pyridyllithium reagent to form an α-(lower alkoxy-p-benzyloxyphenyl)-α-(2-pyridinyl)methanol or α-(lower alkoxy-p-benzyloxyphenyl)-(lower alkyl-substituted)-α-(2-pyridinyl)methanol intermediate, removing the benzyl protecting group from said intermediate by hydrogenation in the presence of e.g. palladium catalyst to form an α-(lower alkoxy-p-hydroxyphenyl)-α-(2-pyridinyl)methanol or α-(lower alkoxy-p-hydroxyphenyl)-(lower alkyl-substituted)-α-(2-pyridinyl)methanol intermediate which is hydrogenated to form the α-(lower alkoxy-p-hydroxyphenyl)-α-(2-piperidinyl)methanol or α-(lower alkoxy-p-hydroxyphenyl)-(lower alkyl-substituted)-α-(2-piperidinyl)methanol final product.

Process III of the invention comprises condensing a (poly-lower alkoxyphenyl) (6-methyl-2-pyridyl)-ketone and 1,3-propanediol in the presence of p-toluenesulfonic acid catalyst to form a 2-(poly-lower alkoxyphenyl)-2-(6-methyl-2-pyridyl)-1,3-dioxane intermediate, C-benzylating said intermediate through treatment with phenyllithium followed by benzyl chloride to form a mixture of the 2-(poly-lower alkoxyphenyl)-2-(6-phenethyl-2-pyridyl)-1,3-dioxane and 2-(poly-lower alkoxyphenyl)-2-(6-dibenzylmethyl-2-pyridyl)-1,3-dioxane intermediate, demethylating and hydrolytically cleaving the dioxane ring to form the (poly-hydroxyphenyl) (6-phenethyl-2-pyridyl)ketone and (poly-hydroxyphenyl) (6-dibenzylmethyl-2-pyridyl)ketone intermediates which are in turn hydrogenated to yield a separable mixture of the α-(poly-hydroxyphenyl)-α-(6-phenethyl-2-piperidinyl)methanol and α-(poly-hydroxyphenyl)-α-(6-dibenzylmethyl-2-piperidinyl)methanol final products.

As used throughout this application the term "lower alkyl" embraces both straight and branched chain alkyl radicals containing from 1 to 6 carbon atoms and cycloalkyl radicals containing from 3 to 6 carbon atoms, for example, but without limitation, methyl, ethyl, n-propyl, isopropyl, n-butyl, tert-butyl, n-amyl, sec-amyl, n-hexyl, 2-ethylbutyl, 2,3-dimethylbutyl, cyclopropyl, cyclobutyl, cyclopentyl, cyclohexyl, and the like; and the term "lower alkoxy" embraces both straight and branched chain alkoxy radicals containing from 1 to 6 carbon atoms, for example, but without limitation, methoxy, ethoxy, n-propoxy, isopropoxy, n-butoxy, tert-butoxy, n-amyloxy, sec-amyloxy, n-hexyloxy, 2-ethylbutoxy, 2,3-dimethylbutoxy, and the like.

The compounds of this invention, in the form of their acid-addition salts, are solid crystalline materials.

The compounds of this invention have significant pharmacological activity as bronchodilator agents. The compounds of the present invention have been found to possess bronchodilator activity that is equivalent to, or better than, that possessed by the known bronchodilator agent aminophylline when evaluated, in vivo in the guinea pig and in vitro in an isolated tissue bath employing guinea pig tracheal tissue, at doses and concentrations, respectively, comparable to those of the aminophylline standards, both of these methods being recognized and accepted in the art of pharmacology for the evaluation of bronchodilator activity.

The starting materials for carrying out Process I of the invention are picolinic acid or a lower alkyl-substituted picolinic acid, and a poly-lower alkoxy-substituted benzaldehyde. α-Picolinic acid and lower alkyl-substituted α-picolinic acids are conveniently prepared by the oxidation of α-picoline and polyalkyl-pyridines with potassium permanganate. Poly-lower alkoxy benzaldehydes are conveniently prepared by the reduction of the corresponding acid chlorides by the Rosemund procedure (Ber. 51:585 (1918)) or by lithium tri-t-butoxyaluminohydride, or by the oxidation of the corresponding benzyl alcohols, for example with manganese dioxide. Among the lower alkyl-substituted picolinic acids that may be used as a starting material, but without limitation, are 6-methylpicolinic acid, 5-ethylpicolinic acid, 4-n-propylpicolinic acid and 3-methylpicolinic acid; and among the poly-lower alkoxy-substituted benzaldehydes that may be used, but without limitation, are 2,3-dimethoxybenzaldehyde, 2,4-diethoxybenzaldehyde, 3,4-dimethoxybenzaldehyde, 2,4,6-trimethoxybenzaldehyde, 2,3,4-triethoxybenzaldehyde, 3,4,5-trimethoxybenzaldehyde and the like.

In carrying out Process I, the picolinic acid or lower alkyl-substituted picolinic acid and an appropriate poly-lower alkoxy-substituted benzaldehyde are condensed to form an α-(poly-lower alkoxyphenyl)-α-(2-pyridinyl)methanol wherein the substitution on the phenyl and pyridine rings corresponds to that in the starting materials. The condensation reaction is carried out in the presence of an inert solvent medium; such as p-cymene, nitrobenzene, or anisole; and at a temperature above 140° C. but preferably at the reflux temperature of the solvent used. The product of the reaction is then recovered by conventional procedures of isolation and crystallization.

The α-(poly-lower alkoxyphenyl)-α-(2-pyridinyl)-methanol intermediate thus formed is then treated with a strong oxidizing agent such as, for example, potassium permanganate, dimethyl sulfoxide-acetic anhydride or dry air, and the like, to form the corresponding (poly-lower alkoxyphenyl) (2-pyridyl)ketone. The crude alcohol can be oxidized without purification. The oxidation reaction may be carried out, when the oxidizing agent is potassium permanganate, in an aqueous solvent medium and at a temperature of up to 80° C. The product is recovered by conventional methods of isolation and purification, and then dealkylated by treatment, preferably, with hydrobromic acid to form a (polyhydroxyphenyl) (2-pyridyl)ketone. The dealkylation is accomplished by heating a solution of the ketone in constant boiling hydrobromic acid under reflux.

In the final step of the reaction sequence, the (polyhydroxyphenyl) (2-pyridyl)ketone is hydrogenated in the presence of a catalyst, e.g. Adams platinum catalyst or platinum on a charcoal support. The hydrogenation is carried out in the presence of an inert organic solvent, e.g. methanol, ethanol or acetic acid, and the like, at atmospheric pressure and a temperature of 20°–60° C. The α-(polyhydroxyphenyl)-α-(2-piperidinyl)methanol final product is recovered by conventional procedures for isolation and purification.

The starting materials for carrying out Process II of the invention are 2-pyridyllithium or lower alkyl-substituted 2-pyridyllithium, which may be prepared by treatment of 2-chloro- or 2-bromopyridine or a lower alkyl-substituted 2-chloro- or 2-bromopyridine in ether solution with freshly cut metallic lithium, and 4-benzyloxy-3-methoxy benzaldehyde (or other alkoxy-substituted benzaldehydes), which may be prepared from vanillin by refluxing with benzylchloride.

In carrying out the above-depicted reaction sequence, the 4-benzyloxy-3-methoxybenzaldehyde in an anhydrous inert organic solvent, e.g. anhydrous ether, is slowly added, at a temperature of from about 0° to −20° C., to a solution of 2-pyridyllithium or lower alkyl-substituted 2-pyridyl-lithium in an anhydrous inert organic solvent, e.g. anhydrous ether, also at a temperature of from about 0° to −20° C., and the resulting mixture allowed to warm to room temperature. The α-(lower alkoxy-p-benzyloxyphenyl)-α-(2-pyridinyl)methanol or α-(lower alkoxy-p-benzyloxyphenyl)-(lower alkyl-substituted)-α-(2-pyridinyl)methanol intermediate forms upon treatment of the reaction mixture with a mineral acid, e.g. hydrochloric acid, and is recovered by conventional techniques of separation and crystallization.

The benzyl protecting group is removed from the intermediate thus formed by hydrogenation in an inert organic solvent, e.g. methanol, in the presence of a pre-reduced palladium or palladium on charcoal catalyst at room temperature and atmospheric pressure. The α-(lower alkoxy-p-hydroxyphenyl)-α-(2-pyridinyl)methanol or α-(lower alkoxy-p-hydroxyphenyl)-(lower alkyl-substituted)-α-(2-pyridinyl)-methanol intermediate thus formed is recovered by conventional procedures of isolation and purification, and then converted to the corresponding α-(lower alkoxy-p-hydroxy-phenyl)-α-(2-piperidinyl)methanol or α-(lower alkoxy-p-hydroxyphenyl)-(lower alkyl-substituted)-α-(2-piperidinyl)-methanol final product by oxidation first and then hydrogenation in the presence of catalyst as described above in the description of Process I of the invention. The final products are recovered by conventional methods of isolation and purification.

The starting material for carrying out Process III of the invention is a (poly-lower alkoxyphenyl) (6-methyl-2-pyridyl)ketone which is prepared as described in the foregoing description of Process I of the invention.

In carrying out the reaction sequence, the substituted-2-pyridylketone starting material is condensed with 1,3-propanediol in an inert organic solvent, e.g. toluene, in the presence of p-toluenesulfonic acid catalyst at the reflux temperature of the solvent used to form a 2-(poly lower-alkoxyphenyl)-2-(6-methyl-2-pyridyl)-1,3-dioxane intermediate.

Treatment of this intermediate, first with phenyllithium reagent and then benzyl chloride in an anhydrous inert organic solvent, e.g. tetrahydrofuran, at reflux temperature and under nitrogen, yields a mixture of 2-(poly-lower alkoxyphenyl)-2-(6-phenethyl-2-pyridyl)-1,3-dioxane and 2-(1-poly-lower alkoxyphenyl)-2-(6-dibenzylmethyl-2-pyridyl)-1,3-dioxane intermediates, which are separated and recovered by conventional methods of isolation and purification.

The phenethyl- and dibenzylmethyl-substituted intermediates, thus obtained, are demethylated with simultaneous opening of the dioxane ring to ketone formation, through treatment at reflux temperature with hydrobromic acid to yield the (polyhydroxyphenyl) (6-phenethyl-2-pyridyl)ketone and (polyhydroxyphenyl) (6-dibenzylmethyl-2-pyridyl)ketone intermediates which, after being recovered by conventional methods of isolation and purification, are converted to the α-(polyhydroxyphenyl)-α-(6-phenethyl-2-piperidinyl)methanol and α-(polyhydroxyphenyl)-α-(6-dibenzylmethyl-2-piperidinyl)-methanol final products by hydrogenation in the presence of catalyst as in the foregoing described Process I.

The compounds of this invention can, if desired, be converted into their pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and is capable of being incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived and are included within the scope of this invention.

The compounds of this invention, either as free bases or in the form of a pharmaceutically acceptable acid-addition or quaternary ammonium salt, can be combined with conventional pharmaceutical diluents and carriers to form such dosage forms as tablets, suspensions, solutions, suppositories and the like.

The individual unit dosage and frequency of administration is determined, not only by the nature and severity of the condition for which the subject seeks relief, but in addition upon age, weight, and species of subject, its underlying physical condition and the route of administration. It will, accordingly, be within the judgement and skill of the practitioner administering the drug to determine the exact amount to be administered so as to be nontoxic, yet pharmaceutically effective in promoting bronchodilation.

The following examples illustrate the preparation of the compounds of the present invention.

EXAMPLE 1 (PROCESS I)

a. α-(3,4-Dimethoxyphenyl)-α-(2-pyridinyl)methanol

Picolinic acid (10 g.) was added over a period of three hours to a boiling solution of 3,4-dimethoxybenzaldehyde (50 g.) in p-cymene (50 ml.). Heating was continued for three hours after the addition, and the reaction then allowed to cool. The cooled reaction mixture was extracted twice with 2N hydrochloric acid (total of 100 ml.). The combined acid extract was washed with ether (100 ml.), made basic with ammonia solution and then extracted four times with ether (total of 200 ml.). The combined ether extracts were concentrated to dryness to yield an oil which, form a solution of acetone-petroleum ether (b.p. 60°–80° C.), yielded α-(3,4-dimethoxyphenyl)-α-(2-pyridinyl)methanol, m.p. 93°–95° C. Ether as used herein refers to diethyl ether.

b. (3,4-Dimethoxyphenyl) (2-Pyridyl)Ketone

α-(3,4-Dimethoxyphenyl)-α-(2-pyridinyl)methanol (10 g.), was suspended with stirring in water (200 ml.) and then warmed to 10° C. Potassium permanganate (4.7 g.) was then added portionwise as the pink coloration was discharged. Excess permanganate was destroyed by the addition of ethanol and the manganese dioxide removed by filtration. The filter cake was extracted three times with boiling industrial methylated spirit (total of 300 ml.) and the filtrate then concentrated under reduced pressure until crystallization commenced. The white needles were collected by filtration, washed with water, and dried in vacuo to give (3,4-dimethoxyphenyl) (2-pyridyl)ketone, m.p. 93°–94° C.

c. (3,4-Dihydroxyphenyl) (2-Pyridyl)Ketone Hydrobromide (3,4-Dimethoxyphenyl) (2-pyridyl)ketone (10g.) was dissolved in constant boiling hydrobromic acid (100 ml.) and heated under reflux for three hours. The dark amber reaction solution was concentrated under reduced pressure and industrial methylated spirit was evaporated from the residue several times to remove the last traces of water. Crystallization from methanol (300 ml.) and ethyl acetate yielded (3,4-dihydroxyphenyl) (2-pyridyl)ketone hydrobromide, m.p. 225°–226° C.

d. erythro-α-(3,4-Dihydroxyphenyl)-α-(2-piperidinyl)-methanol hydrobromide (3,4-Dihydroxyphenyl) (2-pyridyl)ketone hydrobromide (20 g.) in methanol (600 ml.) was hydrogenated at room temperature and at atmospheric pressure in the presence of Adams platinum catalyst (5 g.). After theoretical consumption of hydrogen and taken place, the catalyst and solvent were removed to give a syrup which solidified on trituration with ethyl acetate (250 ml.) and methanol (30 ml.)

The solid was collected by filtration, washed with ethyl acetate/methanol (8:1, 50 ml.) and dried in vacuo to yield erythro-α-(3,4-dihydroxyphenyl)-α-(2-piperidinyl)-methanol hydrobromide, m.p. 220° C. (dec.).

Analysis: Calculated for $C_{12}H_{18}NO_3Br$: C,47.4; H,6.0; N,4.6; Br,26.3. Found: C, 47.5; H,6.1; N,4.6; Br,26.1.

Using the general method described in Example 1, the following compounds are made:

EXAMPLE 2

Starting with 6-methyl-picolinic acid and 3,4-dimethoxybenzaldehyde, compounds, a, b, c and d are successively obtained.

a. α-(3,4-Dimethoxyphenyl)-α-(6-methyl-2-pyridinyl)methanol, m.p. 99°–90° C.
b. (3,4-Dimethoxyphenyl) (6-methyl-2-pyridyl)ketone, m.p. 84°–86° C.
c. (3,4-Dihydroxyphenyl) (6-methyl-2-pyridyl)ketone hydrobromide, m.p. 224° C. (d.).
d. α-(3,4-Dihydroxyphenyl)-α-(6-methyl-2-piperidinyl)-methanol hydrobromide, m.p. 216° C. (d.).

EXAMPLE 3

Starting with picolinic acid and 3,4,5-trimethoxybenzaldehyde, compounds a, b, c and d are successively obtained.

a. α-(3,4,5-Trimethoxyphenyl)-α-(2-pyridinyl)methanol.
b. (3,4,5-Trimethoxyphenyl) (2-pyridyl)ketone, m.p. 111°-112° C.
c. (3,4,5-Trihydroxyphenyl) (2-pyridyl)ketone hydrobromide, m.p. 240° C. (d.).
d. erythro-α-(3,4,5-Trihydroxyphenyl)-α-(2-piperidinyl)-methanol hydrobromide, m.p. 130°-140° C.

EXAMPLE 4 (Process II)

a.
α-(4-Benzyloxy-3-methoxyphenyl)-α-(2-pyridinyl)methanol

Small pieces of lithium (12.7 g.) were suspended in dry ether (250 ml.) under nitrogen and n-butyl bromide (123 g.) in dry ether (100 ml.) was added over a period of 0.5 hour at −5° to 0° C. The mixture was stirred for 2.5 hours at this temperature and then cooled to −20° C. when 2-bromopyridine (95 g.) in dry ether (50 ml.) was added dropwise. After the addition, the mixture was stirred for 15 minutes and then 4-benzyloxy-3-methoxybenzaldehyde (145 g.) in dry ether (1.5 liters) was added over a one hour period at −20° C. On completion of the addition, the reaction mixture was allowed to attain room temperature over a period of 1.5 hours. Treatment of the mixture with 3N hydrochloric acid afforded crude product which separated at the interface between the phases and which was collected by filtration and dried in vacuo over phosphorus pentoxide. Concentration of the ethereal layer gave a dark brown oil which on trituration with the acid layer afforded a further quantity of crude α-(4-benzyloxy-3-methoxy)-α-(2-pyridinyl)methanol which was recrystallized from ethanol, m.p. 124°-125° C.

b.
α-(4-Hydroxy-3-methoxyphenyl)-α-(2-pyridinyl)methanol

A solution of α-(4-benzyloxy-3-methoxyphenyl)-α-(2-pyridinyl)methanol (80 G.) in methanol (1.5 liters) was shaken with hydrogen in the presence of pre-reduced palladium on charcoal catalyst (10%, 40 g.) at room temperature and atmospheric pressure until the theoretical consumption of gas had taken place. Removal of the catalyst and concentration of the solution to a volume of about 250 ml., after storage at 0° C., yielded α-(4-hydroxy-3-methoxy)-α-(2-pyridinyl)methanol, m.p. 136°-137° C. Two further crops of product were obtained by concentration of the mother liquors. An analytical sample had m.p. 137° C.

Analysis: Calculated for $C_{13}H_{13}NO_3$: C, 67.5; H, 5.7; N, 6.1. Found: C, 67.35; H, 5.5; N, 6.0.

c.
erythro-α-(4-Hydroxy-3-methoxyphenyl)-α-(2-piperidinyl)-methanol hydrochloride A solution of α-(4-hydroxy-3-methoxyphenyl)-α-(2-pyridinyl)methanol (25.5 g.) in methanol (200 ml.) and 5N hydrochloric acid (23 ml.) was hydrogenated at room temperature and atmospheric pressure in the presence of Adams platinum catalyst (3 g.). After hydrogen (3 mole) had been consumed, the catalyst and solvent were removed to give a solid residue. Recrystallization of this material from a mixture of methanol and ether gave erythro-α-(4-hydroxy-3-methoxy-phenyl)-α-(2-piperidinyl)methanol hydrochloride, m.p. 242°-245° C.

Analysis: Calculated for $C_{13}H_{20}NO_3Cl$: C,57.0; H,7.4; N,5.1; Cl,12.95. Found: C,57.1; H,7.4; N,5.1; Cl,13.3.

EXAMPLE 5 (Process III)

a.
2-(3,4-Dimethoxyphenyl)-2-(6-methyl-2-pyridyl)-1,3-dioxane (3,4-Dimethoxyphenyl) (6-methyl-2-pyridyl)ketone (77.1 g., 0.3 mole), p-toluenesulfonic acid (74.1 g., 0.39 mole) and 1,3-propanediol (22.8 ml., 0.315 mole) in toluene (600 ml.) were heated under reflux with stirring for 17 hours, the water evolved during the reaction being trapped by means of a Dean and Stark head. The cooled solution was neutralized with saturated sodium bicarbonate (500 ml.) and the phases separated. The organic layer was washed with saturated sodium bicarbonate solution and dried over magnesium sulfate. Removal of the desiccant and solvent gave a solid residue which on recrystallization from a mixture of acetone and petroleum ether (b.p. 60°-80° C.) yielded 2-(3,4-dimethoxyphenyl)-2-(6-methyl-2-pyridyl)-1,3-dioxane, m.p. 124°-126° C.

b.
2-(3,4-Dimethoxyphenyl)-2-(6-phenethyl-2-pyridyl)-1,3-dioxane and 2-(3,4-dimethoxyphenyl)-2-(6-dibenzylmethyl-2-pyridyl)-1,3-dioxane Bromobenzene (8.66 ml.) in dry ether (20 ml.) was added over a period of 30 minutes to a stirred suspension of lithium shavings (1.0 g.) in dry ether (50 ml.) under a nitrogen atmosphere. This rate of addition was sufficient to maintain the reaction at a gentle reflux. After the addition, the mixture was stirred for 1.5 hours and then 2-(3,4-dimethoxyphenyl)-2-(6-methyl-2-pyridyl)-1,3-dioxane (18.9 g.) dissolved in the minimum quantity of dry tetrahydrofuran was added. Benzyl chloride (8 g.) in dry tetrahydrofuran (10 ml.) was then added dropwise at such a rate that gentle boiling occurred, and the reaction was stirred for 0.5 hour after the addition. Lithium complexes were decomposed by the addition of saturated ammonium chloride solution and the phases were separated. The organic layer was diluted with ether (200 ml.) and extracted with 2N hydrochloric acid (2 × 100 ml.). The acid extract was washed with ether (100 ml.), basified with ammonia solution and the liberated basic products extracted into chloroform (2 × 60 ml.). Concentration of the dried extracts gave a syrup which was applied to a column of silica gel (30 × 4cm) and eluted with a mixture of chloroform/ethyl acetate (4:1). Twenty-four successive fractions (25 ml.) were collected and examined by thin layer chromatography. Three main components were detected in the reaction mixture, and the slowest moving compound had an identical mobility to that of the starting material. Fractions 1 to 13 were discarded since no product was detected. Fractions after 24 were discarded because they contained increasing amounts of starting material. Fractions 14 to 16 and 17 and 18 gave crystalline material on trituration with ethanol which had identical infrared spectra (no carbonyl functions present). Recrystallization of this material from ethanol yielded 2-(3,4-dimethoxyphenyl)-2-(6-dibenzylmethyl-2-pyridyl)-1,3-dioxane, m.p. 124° C.

Analysis: Calculated for $C_{32}H_{33}NO_4$: C, 77.55; H, 6.7; N, 2.8. Found: C, 77.65; H, 6.8; N, 3.0. Fractions 19 to 21 and 22 to 24 slowly crystallized and recrystallization from industrial methylated spirit gave 2-(3,4-dimethoxyphenyl)-2-(6-phenylethyl-2-pyridyl)-1,3-dioxane, m.p. 86°–87° C.

Analysis: Calculated for $C_{25}H_{27}NO_4$: C, 74.05; H, 6.7; N, 3.45 Found: C, 74.1; H, 6.6; N, 3.6.

c. (3,4-Dihydroxyphenyl) (6-Phenethyl-2-pyridyl)ketone hydrobromide

A solution of 2-(3,4-dimethoxyphenyl)-2-(6-phenylethyl-2-pyridyl)-1,3-dioxane (3.5 g.) in hydrobromic acid (48%, 20 ml.) was heated under reflux for 20 hours. The solvent was removed under reduced pressure and industrial methylated spirit was evaporated several times from the residue which crystallized on trituration with ethyl acetate. Recrystallization from methanol-ethyl acetate yielded (3,4-dihydroxyphenyl) (6-phenylethyl-2-pyridyl)ketone hydrobromide, m.p. 181° C.

Analysis: Calculated for $C_{20}H_{18}NO_3Br$: C,60.0; H,4.5; N,3.5; Br,20.0. Found: C,60.2; H,4.7; N,3.6; Br,20.35.

d. (3,4-Dihydroxyphenyl) (6-Dibenzylmethyl-2-pyridyl)-ketone

A solution of 2-(3,4-dimethoxyphenyl)-2-(6-dibenzylmethyl-2-pyridyl)-1,3-dioxane (2.0 g.) in constant boiling hydrobromic acid (20 ml.) was heated under refulx for 16 hours. The free base was liberated with ammonia solution and extracted into ether (2 × 55 ml.). Removal of the solvent from the dried extracts gave a syrupy residue which on crystallization from ether-petroleum ether (b.p. 60°–80° C.) yielded (3,4-dihydroxyphenyl) (6-dibenzylmethyl-2-pyridyl)-ketone, m.p. 141°–143° C.

e. erythro-α-(3,4-Dihydroxyphenyl)-α-(6-phenethyl-2-piperidinyl)methanol hydrobromide (3,4-Dihydroxyphenyl) (6-phenylethyl-2-pyridyl)-ketone hydrobromide (2.0 g.) in methanol (100 ml.) was hydrogenated in the presence of Adams platinum catalyst (0.2 g.) at atmospheric pressure and room temperature. After hydrogen (4 mole) had been consumed, the catalyst and solvent were removed to give a syrup from which a sample (100 mg.) was removed for nuclear magnetic resonance spectroscopic analysis. The remainder was crystallized from a mixture of methanol ethyl acetate to give erythro-α-(3,4-dihydroxyphenyl)-α-(6-phenylethyl-2-piperidinyl)methanol hydrobromide, m.p. 204° C.

Analysis: Calculated for $C_{20}H_{26}NO_3Br$: C,58.8; H,6.4; N,3.4; Br,19.6. Found: C,58.6; H6.6; N,3.5; Br,19.9.

f. α-(3,4-Dihydroxyphenyl)-α-(6-dibenzylmethyl-2-piperidinyl)methanol

A solution of (3,4-dihydroxyphenyl) (6-dibenzylmethyl-2-pyridyl)ketone (1.2 g.) in methanol (100 ml.) and 5M hydrochloric acid (0.585 ml.) was hydrogenated in the presence of Adams platinum catalyst (0.3 g.) at room temperature and atmospheric pressure. After the theoretical quantity of hydrogen had been consumed, the catalyst and solvent were removed to give a syrup. The evaporation of ethyl acetate from the residue afforded a dry froth which was powered under ether, collected by filtration and dried in vacuo. Yield, 1.22 g.

EXAMPLE 6

α-(3,4-Dihydroxyphenyl)-α-2-piperidinyl methanol of Example 1 was tested for bronchodilator activity and the results compared with those obtained in the same test with aminophylline and isoprenaline (3,4-dihydroxy-α-[(isopropylamino)methyl]benzyl alcohol, an established bronchodilator agent also known as isoproterenol.

a. Isolated Organs

The test compound had approximately the same relaxant activity as isoprenaline when tested on the isolated guinea pig trachael chain, and approximately 34,000 times the activity of aminophylline.

b. Anesthetized Animals

The test compound inhibited histamine-induced broncho-spasm in the anesthetized artifically respired guinea pig. The test compound had approximately 1/15th the activity of isoprenaline when administered intravenously, and approximately 2,000 times the activity of aminophylline. After oral administration the test compound was active at a dose of 10 mg/kg, while isoprenaline is active at 2.5 mg/kg.

c. Conscious Animals

The test compound reduced the severity of the anaphylactic reaction in sensitized guinea pigs challenged by inhalation of antigen.

The test compound had oral activity comparable to aminophylline at a dose of 25 mg/kg. It had activity comparable to isoprenaline when injected intraperitoneally.

The test compound was administered as the hydrobromide and isoprenaline as isoprenaline sulfate.

What is claimed is:

1. A process for preparation of α-(polyhydroxyphenyl)-α-(phenethyl-2-piperidinyl)methanol and α-(polyhydroxyphenyl)-α-(dibenzylmethyl-2-piperidinyl)methanol which comprises condensing a (poly-lower alkoxyphenyl) (methyl-2-pyridyl)ketone and 1,3-propanediol in an inert organic solvent at reflux temperature of the solvent and in the presence of p-toluenesulfonic acid catalyst to form a 2-(poly-lower alkoxyphenyl)-2-(methyl-2-pyridyl)-1,3-dioxane, C-benzylating said 2-(poly-lower alkoxyphenyl)-2-(methyl-2-pyridyl)-1,3-dioxane by treatment with phenyllithium followed by benzyl chloride to form 2-(poly-lower alkoxyphenyl)-2-(phenethyl-2-pyridyl)-1,3-dioxane and 2-(poly-lower alkoxyphenyl)-2-(dibenzylmethyl-2-pyridyl)-1,3-dioxane, demethylating and hydrolytically cleaving the dioxane ring of said compounds to form (poly-hydroxyphenyl) (phenethyl-2-pyridyl)ketone and (poly-hydroxyphenyl) (dibenzylmethyl-2-pyridyl)ketone which are hydrogenated in the presence of platinum catalyst to yield the α-(polyhydroxyphenyl)-α-(phenethyl-2-piperidinyl)methanol and α-(polyhydroxyphenyl)-α-(dibenzylmethyl-2-piperidinyl)methanol.

* * * * *